(12) United States Patent
Nagaraja et al.

(10) Patent No.: US 10,368,373 B2
(45) Date of Patent: Jul. 30, 2019

(54) BEAM SELECTION AND REFINEMENT DURING A RANDOM ACCESS CHANNEL (RACH) PROCEDURE

(71) Applicant: QUALCOMM Incorporated, San Diego, CA (US)

(72) Inventors: Sumeeth Nagaraja, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/656,576

(22) Filed: Jul. 21, 2017

(65) Prior Publication Data

US 2018/0027594 A1    Jan. 25, 2018

Related U.S. Application Data

(60) Provisional application No. 62/366,595, filed on Jul. 25, 2016.

(51) Int. Cl.
| | | |
|---|---|---|
| *H04B 7/08* | (2006.01) | |
| *H04W 72/04* | (2009.01) | |
| *H04W 16/28* | (2009.01) | |
| *H04W 74/08* | (2009.01) | |
| *H04B 7/06* | (2006.01) | |

(52) U.S. Cl.
CPC ...... *H04W 74/0833* (2013.01); *H04B 7/0695* (2013.01); *H04B 7/088* (2013.01); *H04B 7/0811* (2013.01); *H04W 16/28* (2013.01); *H04W 72/046* (2013.01)

(58) Field of Classification Search
None
See application file for complete search history.

(56) References Cited

U.S. PATENT DOCUMENTS

| | | | |
|---|---|---|---|
| 2009/0280867 A1* | 11/2009 | Hovers | ........... H04B 7/0695 455/562.1 |
| 2012/0320874 A1 | 12/2012 | Li et al. | |
| 2015/0222345 A1 | 8/2015 | Chapman et al. | |
| 2016/0029358 A1 | 1/2016 | Hou et al. | |
| 2016/0043792 A1 | 2/2016 | Jeong et al. | |
| 2016/0099763 A1* | 4/2016 | Chen | ............ H04B 7/063 370/329 |
| 2016/0157267 A1 | 6/2016 | Frenne et al. | |

(Continued)

OTHER PUBLICATIONS

International Search Report and Written Opinion—PCT/US2017/043420—ISA/EPO—dated Oct. 18, 2017.

(Continued)

*Primary Examiner* — Ajit Patel
(74) *Attorney, Agent, or Firm* — Patterson & Sheridan, LLP

(57) ABSTRACT

Aspects of the present disclosure relate to wireless communications and, more particularly, to beam refinement during a RACH procedure. A NB may receive a message via a first beam from a UE as part of a RACH procedure and may transmit at least one signal for beam refinement during the RACH procedure. A UE may transmit, to a NB, a message via a first beam as part of a RACH procedure and may receive, from the NB, at least one signal for beam refinement during the RACH procedure. Any directional signal beam may be used for beam refinement as described herein.

30 Claims, 10 Drawing Sheets

(56) References Cited

U.S. PATENT DOCUMENTS

| | | |
|---|---|---|
| 2016/0197659 A1 | 7/2016 | Yu et al. |
| 2016/0198474 A1 | 7/2016 | Raghavan et al. |
| 2016/0241322 A1* | 8/2016 | Son .................... H04B 7/0617 |
| 2016/0285660 A1 | 9/2016 | Frenne et al. |
| 2017/0257780 A1* | 9/2017 | Ryoo .................... H04W 16/28 |
| 2017/0331670 A1* | 11/2017 | Parkvall ............... H04J 11/0079 |
| 2018/0049055 A1* | 2/2018 | Wiberg ................ H04B 7/0695 |
| 2018/0054245 A1* | 2/2018 | Trainin ................ H04W 16/28 |
| 2018/0198504 A1* | 7/2018 | Li ........................ H04L 5/0044 |

OTHER PUBLICATIONS

Samsung: "Random Access Procedure in NR," 3GPP Draft; R2-163372, $3^{rd}$ Generation Partnership Project (3GPP), Mobile Competence Centre; 650, Route Des Lucioles; F-06921 Sophia-Antipolis Cedex; France, vol. RAN WG2, No. Nanjing, China; May 23, 2016-May 27, 2016, May 22, 2016, XP051104903, 7 pages, Retrieved from the Internet: URL: http://www.3gpp.org/ftp/Meetings_3GPP_SYNC/RAN2/Docs/ [retrieved on May 22, 2016].

* cited by examiner

BEAM SELECTION AND REFINEMENT DURING A RANDOM ACCESS CHANNEL (RACH) PROCEDURE

CROSS-REFERENCE TO RELATED APPLICATIONS

This application claims benefit of priority from commonly-owned U.S. Provisional Application Ser. No. 62/366,595, filed Jul. 25, 2016, and entitled "BEAM SELECTION AND REFINEMENT DURING A RANDOM ACCESS CHANNEL (RACH) PROCEDURE," which is expressly incorporated herein by reference in its entirety.

FIELD OF THE DISCLOSURE

Aspects of the present disclosure generally relate to wireless communication and, more particularly, to beam selection and beam refinement during a random access channel (RACH) procedure.

DESCRIPTION OF RELATED ART

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations (e.g., Node B, evolved Node B (eNB), Access Point (AP), Base Station Transceiver (BST), Transmit/Receive Point (TRP)) to the terminals, and the reverse link (or uplink) refers to the communication link from the terminals to the base stations. This communication link may be established via a single-input single-output, multiple-input single-output or a multiple-input multiple-output (MIMO) system.

In LTE or LTE-A network, for example, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "DETAILED DESCRIPTION" one will understand how the features of this disclosure provide advantages that include improved communications between access points and stations in a wireless network.

Certain aspects of the present disclosure generally relate to beam selection and refinement during a RACH procedure.

Certain aspects of the present disclosure provide a method for wireless communication by a node B (NB). The method generally includes receiving a message via a first beam from a user equipment (UE) as part of a random access channel (RACH) procedure and transmitting at least one signal for beam refinement during the RACH procedure.

Certain aspects of the present disclosure provide a method for wireless communication by a user equipment (UE). The method generally includes transmitting, to a node B (NB), a message via a first beam as part of a random access channel (RACH) procedure and receiving, from the NB, at least one signal for beam refinement during the RACH procedure.

Certain aspects of the present disclosure provide an apparatus for wireless communication by a node B (NB). The apparatus generally includes means for receiving a message via a first beam from a user equipment (UE) as part of a random access channel (RACH) procedure and means for transmitting at least one signal for beam refinement during the RACH procedure.

Certain aspects of the present disclosure provide an apparatus for wireless communication by a user equipment (UE). The apparatus generally includes means for transmitting, to a node B (NB), a message via a first beam as part of a random access channel (RACH) procedure and means for receiving, from the NB, at least one signal for beam refinement during the RACH procedure.

Certain aspects of the present disclosure provide an apparatus for wireless communication by a node B (NB) comprising a processor and a memory coupled to the at least one processor. The at least one processor is generally configured to receive a message via a first beam from a user equipment (UE) as part of a random access channel (RACH) procedure and transmit at least one signal beam refinement during the RACH procedure.

Certain aspects of the present disclosure provide an apparatus for wireless communication by a user equipment (UE) comprising a processor and a memory coupled to the at least one processor. The at least one processor is generally configured to transmit, to a node B (NB), a message via a first beam as part of a random access channel (RACH) procedure and receive, from the NB, at least one signal for beam refinement during the RACH procedure.

Certain aspects of the present disclosure provide a computer readable medium for wireless communication by a node B (NB) having computer-executable instructions stored thereon for receiving a message via a first beam from a user equipment (UE) as part of a random access channel (RACH) procedure and transmitting at least one signal for beam refinement during the RACH procedure.

Certain aspects of the present disclosure provide a computer readable medium for wireless communication by a user equipment (UE) having computer-executable instructions stored thereon for transmitting, to a node B (NB), a message via a first beam as part of a random access channel (RACH) procedure and receiving, from the NB, at least one signal for beam refinement during the RACH procedure.

Aspects generally include methods, apparatus, systems, computer program products, and processing systems, as substantially described herein with reference to and as illustrated by the accompanying drawings.

Other aspects, features, and embodiments of the present invention will become apparent to those of ordinary skill in the art, upon reviewing the following description of specific, exemplary aspects of the present invention in conjunction with the accompanying figures. While features of the present disclosure may be discussed relative to certain aspects and figures below, all embodiments of the present disclosure can include one or more of the advantageous features discussed herein. In other words, while one or more aspects may be discussed as having certain advantageous features, one or more of such features may also be used in accordance with the various aspects of the disclosure discussed herein. In similar fashion, while exemplary aspects may be discussed below as device, system, or method aspects it should be understood that such exemplary aspects can be implemented in various devices, systems, and methods.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. The appended drawings illustrate only certain typical aspects of this disclosure, however, and are therefore not to be considered limiting of its scope, for the description may admit to other equally effective aspects.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
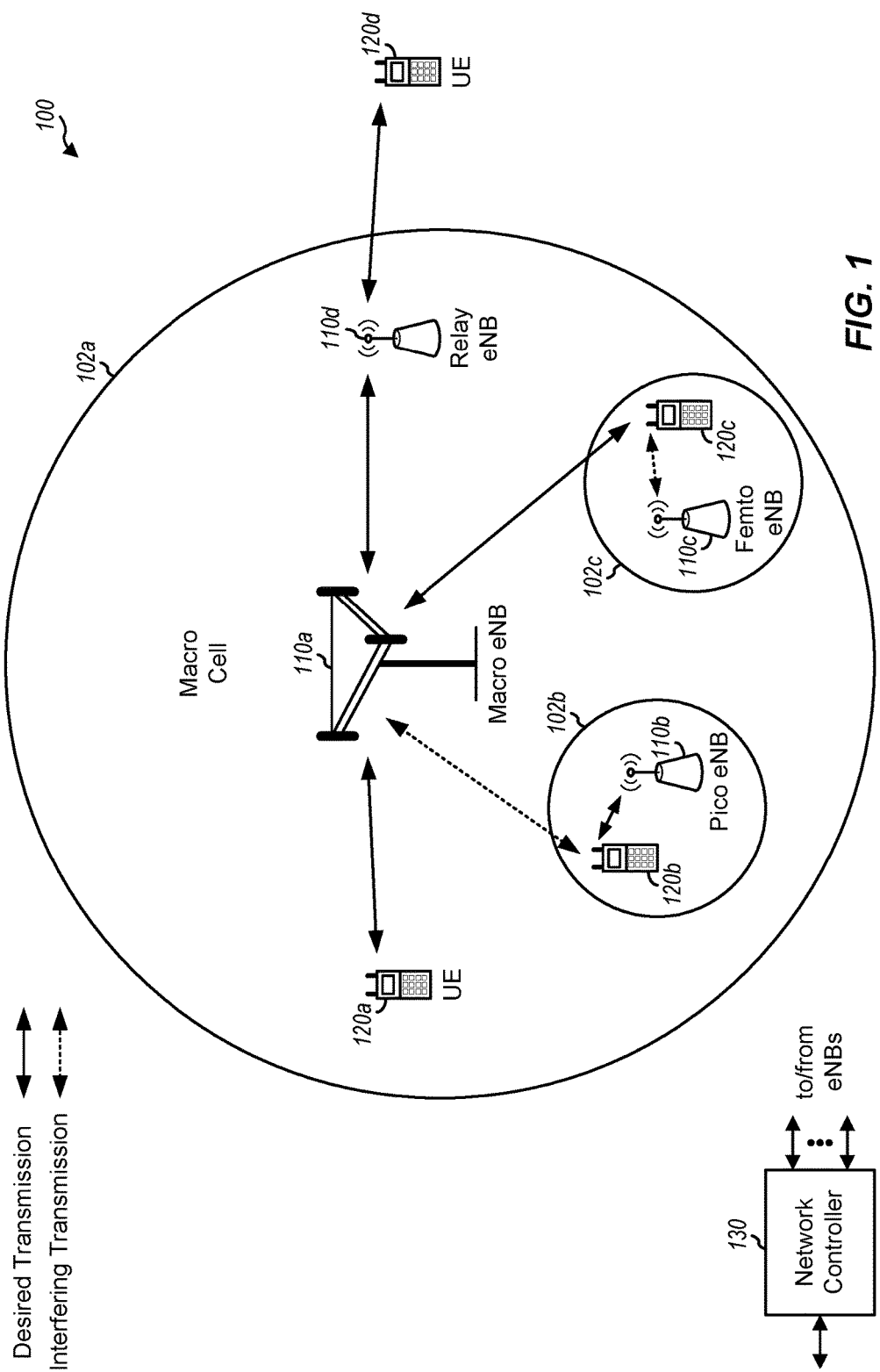
FIG. 1 illustrates an example of a wireless communication network, in accordance with certain aspects of the present disclosure.

Aspects of the present disclosure relate to beam refinement during a RACH procedure.

As will be described in more detail herein, millimeter-wave (mmWave) communications bring gigabit speeds to cellular networks, due to availability of large amounts of bandwidth. The unique challenges of heavy path-loss faced by millimeter-wave systems necessitate new techniques such as hybrid beamforming (analog and digital), which are not present in 3G and 4G systems. Hybrid beamforming may enhance link budget/signal to noise ratio (SNR) that may be exploited during the RACH.

Spectrum bands in high frequencies (e.g., 28 GHz, may be referred to as mmWave) provide large bandwidths capable of delivering multi-Gbps data rates, as well as extremely dense spatial reuse which may increase capacity. Traditionally, these higher frequencies were not robust enough for indoor/outdoor mobile broadband applications due to high propagation loss and susceptibility to blockage (e.g., from buildings, humans, and the like).

Despite these challenges, at the higher frequencies in which mmWaves operate, small wavelengths enable a large number of antenna elements in a relatively small form factor. Unlike microwave links, which may cast very wide footprints, reducing the achievable amount of reuse of the same spectrum within a geographical area, mmWave links cast very narrow beams. This characteristic of mmWave may be leveraged to form directional beams that may send and receive more energy to overcome propagation and path loss challenges.

These narrow directional beams can also be utilized for spatial reuse. This is one of the key enablers for utilizing mmWave for mobile broadband services. In addition, the non-line-of-site (NLOS) paths (e.g., reflections from nearby building) can have very large energies, providing alternative paths when line-of-site (LOS) paths are blocked.

With more antenna elements and narrow beams, it becomes increasingly vital to transmit signals in the appropriate direction, in an effort to maximize the received signal energy at the UE.

Aspects described herein provide methods and apparatus to utilize hybrid beamforming gains during a RACH procedure. As will be described in more detail herein, a UE may select an initial beam for performing a RACH procedure with an NB. The selected beam may be based, for example, on a beam reference signal (BRS) transmitted by the NB. The NB may transmit an additional beam, known as a measurement reference signal (MRS) or beam refinement reference signal (BRRS) to a UE during a RACH procedure, which may be used to refine the BRS-based beam during the RACH.

Aspects described herein refer to specific examples of directional reference signal beams such as BRS, MRS, and BRRS. While BRS, MRS, and BRRS are provided as illustrative examples of directional reference signals, the techniques and methods presented herein are not limited to these or any specific reference signals. The directional reference signals used herein may refer to any type of beam or directional reference signal.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE.

Some examples of UEs may include cellular phones, smart phones, personal digital assistants (PDAs), wireless modems, handheld devices, tablets, laptop computers, netbooks, smartbooks, ultrabooks, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link.

It is noted that while aspects may be described herein using terminology commonly associated with 3G and/or 4G wireless technologies, aspects of the present disclosure can be applied in other generation-based communication systems, such as 5G and later.

An example of an emerging telecommunication standard is new radio (NR), for example, 5G radio access. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

EXAMPLE WIRELESS COMMUNICATIONS NETWORK

FIG. 1 illustrates an example wireless communication network 100, in which aspects of the present disclosure may be practiced. Techniques presented herein may be used for beam refinement during a RACH procedure.

For example, NB 110 (eNB, BS, AP, TRP) may receive a message via a first beam from a UE as part of a RACH procedure and may transmit at least one signal for beam refinement. According to one example, the at least one signal may be used to further refine the first beam during the RACH procedure. Correspondingly, a UE 120 may transmit to a NB, a message via a first beam as part of a RACH procedure and may receive, from the NB, at least one signal for beam refinement during the RACH procedure.

The network 100 may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, etc. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

Figure 2:
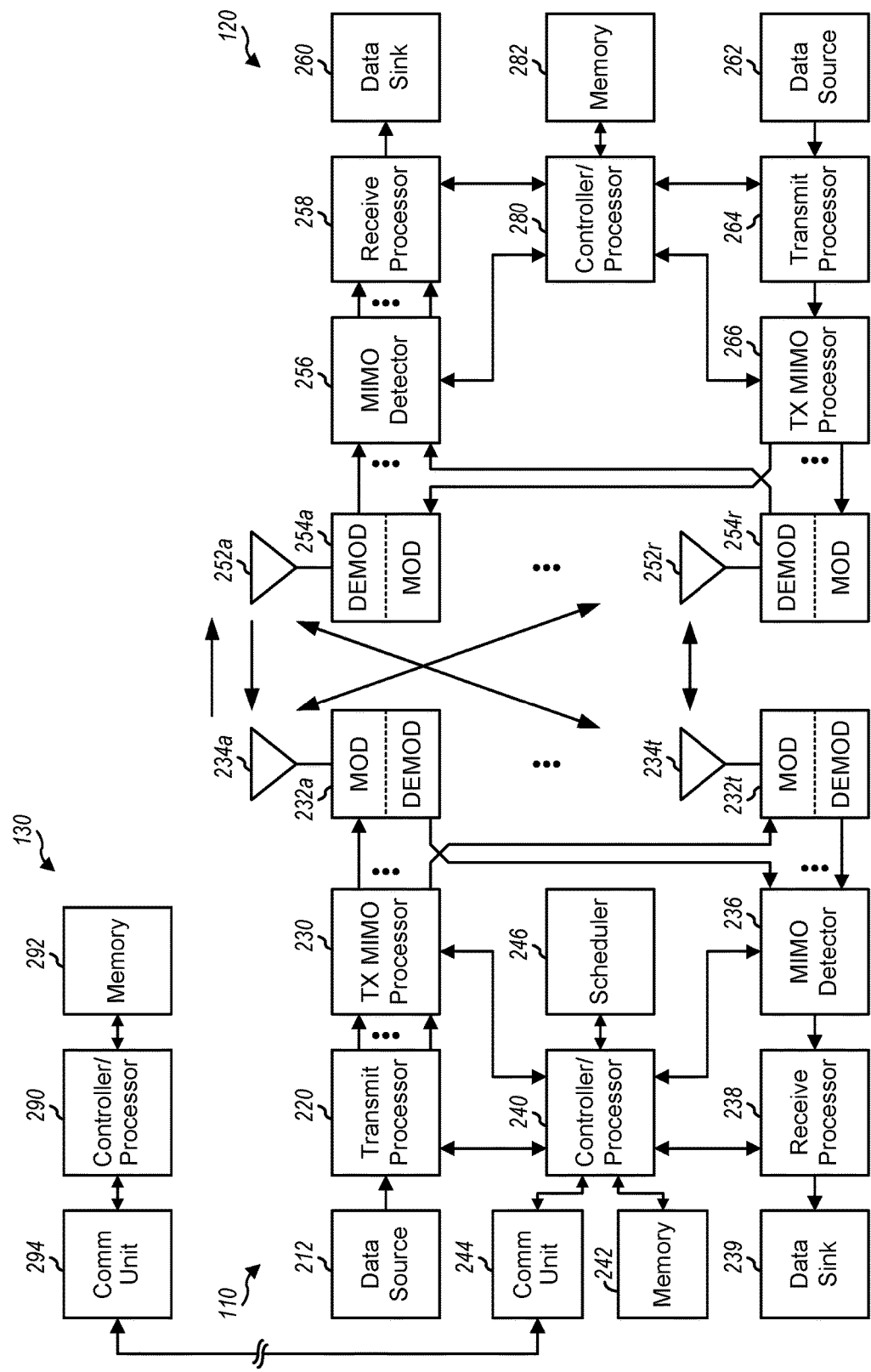
FIG. 2 shows a block diagram conceptually illustrating an example of a base station (BS) in communication with a user equipment (UE) in a wireless communications network, in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, Rnn, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively, to perform techniques presented herein for beam refinement during a RACH procedure.

One or more modules illustrated in FIG. 2 may be configured to perform the operations described herein and illustrated in FIGS. 6-10. At the eNB, the controller/processor 240, transmit processor 220, receive processor 238, scheduler 246, mod/demod 232, and/or antenna 234 may be configured to perform the recited and described operations including the recited means for transmitting, means for receiving, means for determining, means for configuring, and means for instructing. At the UE, the controller/processor 280, receiver processor 258, transmit processor 264, mod/demod 254, and antenna 252 may be configured to perform the recited and described operations including the means for transmitting, means for receiving, and means for measuring.

Memories 242 and 282 may store data and program codes for base station 110 and UE 120, respectively. A scheduler 246 may schedule UEs for data transmission on the downlink and/or uplink.

Figure 3:
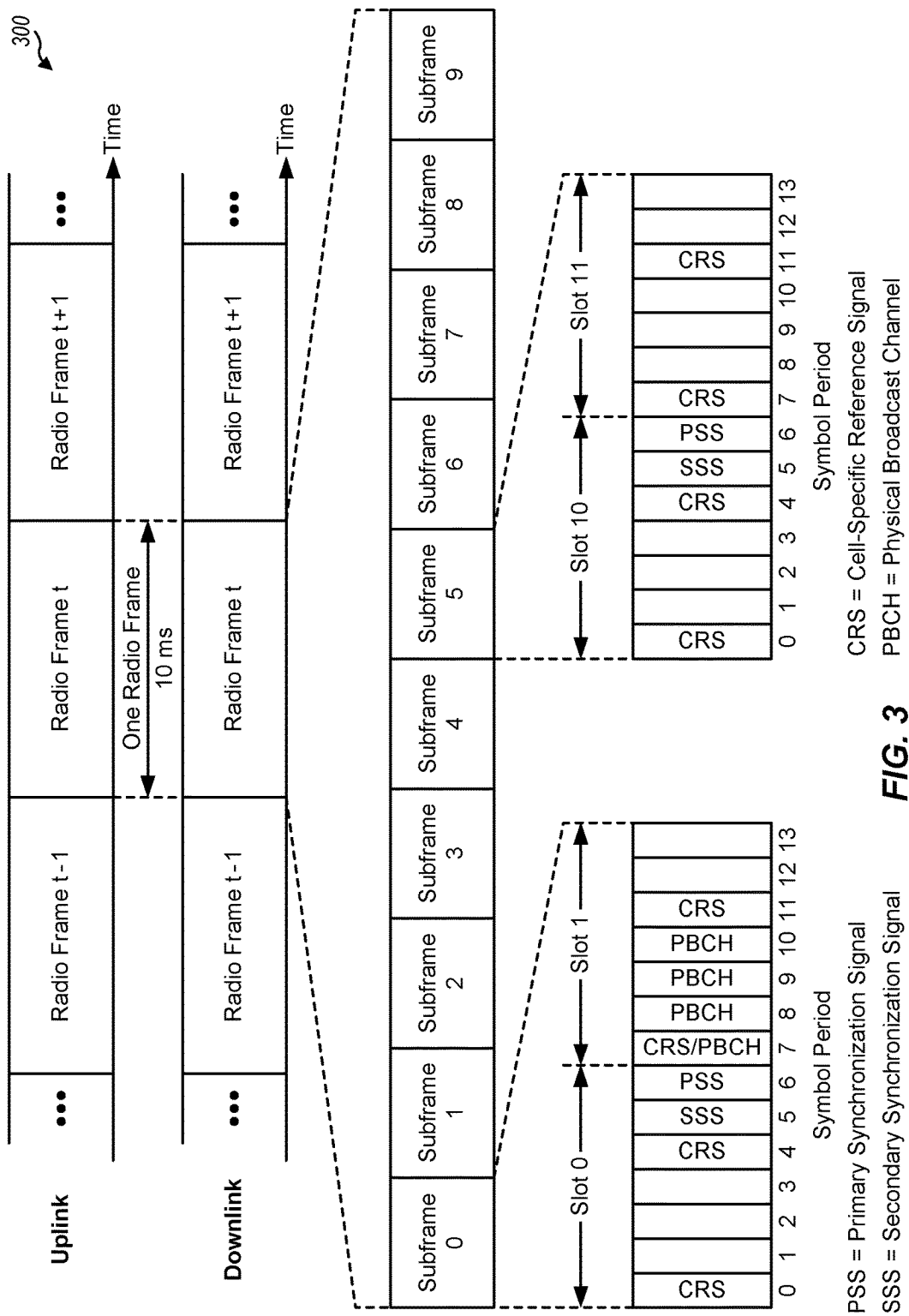
FIG. 3 is a block diagram conceptually illustrating an example of a frame structure in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

Figure 4:
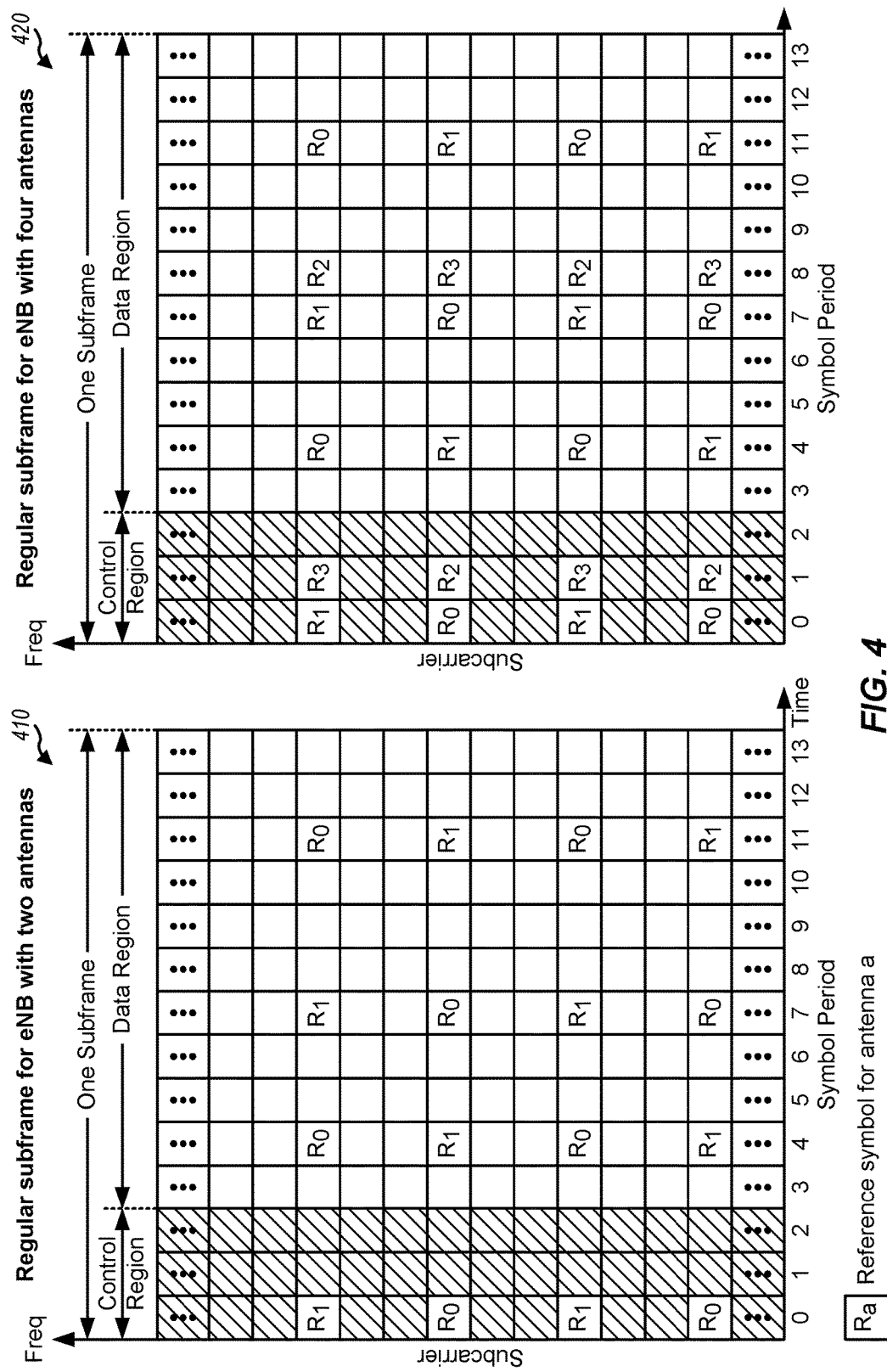
FIG. 4 is a block diagram conceptually illustrating two exemplary subframe formats with the normal cyclic prefix.

FIG. 4 shows two exemplary subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

Figure 5:
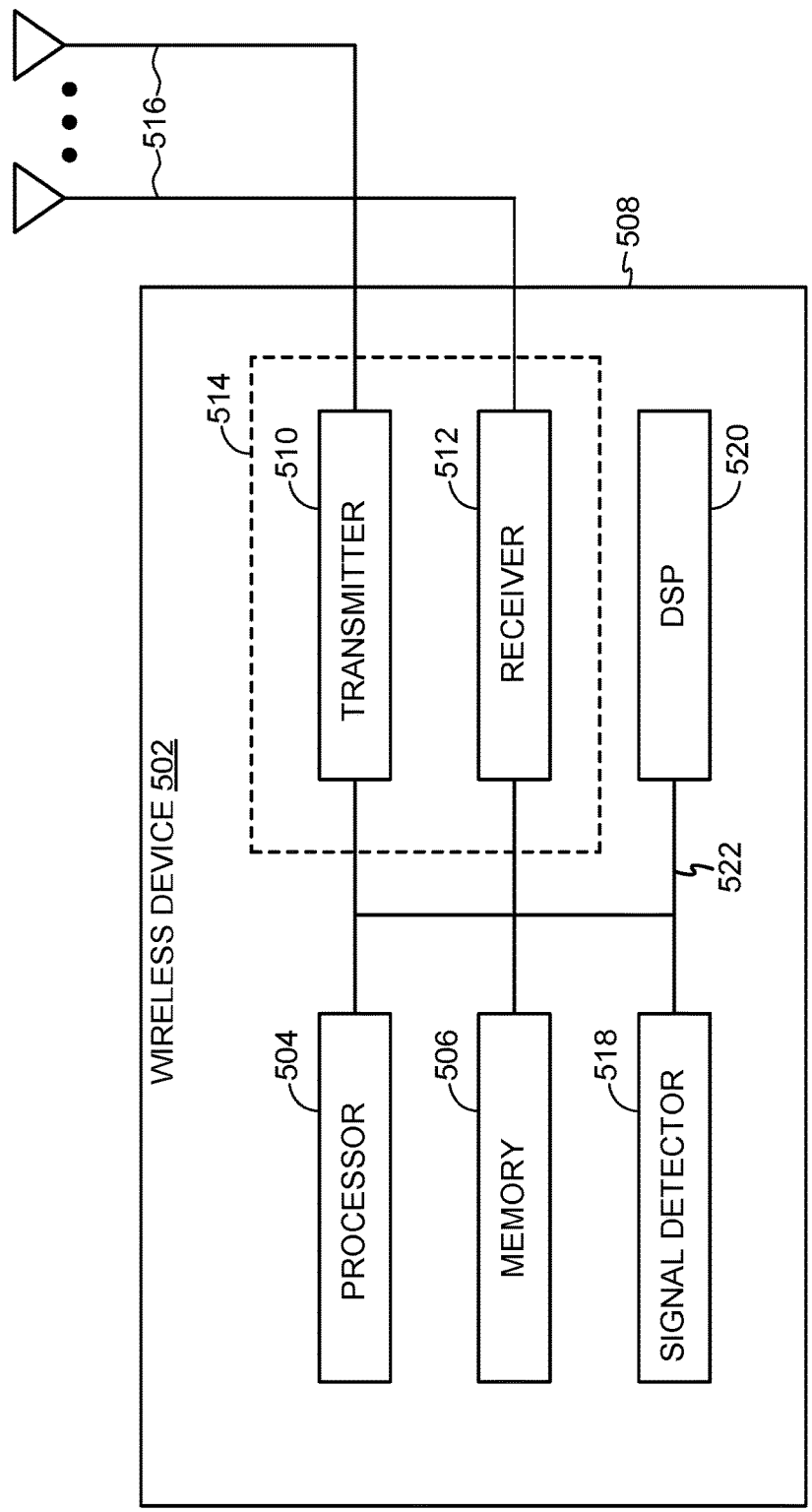
FIG. 5 illustrates various components that may be utilized in a wireless device, in accordance with certain aspects of the present disclosure.

FIG. 5 illustrates various components that may be utilized in a wireless device 502 that may be employed within the wireless communication system 100 illustrated in FIG. 1. The wireless device 502 is an example of a device that may be configured to implement the various methods described herein. The wireless device 502 may be a base station 110 or any of the wireless nodes (e.g., 120). For example, the wireless device 502 may be configured to perform operations and techniques illustrated in FIGS. 6-10 as well as other operations described herein.

The wireless device 502 may include a processor 504 that controls operation of the wireless device 502. The processor 504 may also be referred to as a central processing unit (CPU). Memory 506, which may include both read-only memory (ROM) and random access memory (RAM), provides instructions and data to the processor 504. A portion of the memory 506 may also include non-volatile random access memory (NVRAM). The processor 504 typically performs logical and arithmetic operations based on program instructions stored within the memory 506. The instructions in the memory 506 may be executable to implement the methods described herein. Some non-limiting examples of the processor 504 may include Snapdragon processor, application specific integrated circuits (ASICs), programmable logic, etc.

The wireless device 502 may also include a housing 508 that may include a transmitter 510 and a receiver 512 to allow transmission and reception of data between the wireless device 502 and a remote location. The transmitter 510 and receiver 512 may be combined into a transceiver 514. A single transmit antenna or a plurality of transmit antennas 516 may be attached to the housing 508 and electrically coupled to the transceiver 514. The wireless device 502 may also include (not shown) multiple transmitters, multiple receivers, and multiple transceivers. The wireless device 502 can also include wireless battery charging equipment.

The wireless device 502 may also include a signal detector 518 that may be used in an effort to detect and quantify the level of signals received by the transceiver 514. The signal detector 518 may detect such signals as total energy, energy per subcarrier per symbol, power spectral density and other signals. The wireless device 302 may also include a digital signal processor (DSP) 520 for use in processing signals.

The various components of the wireless device 502 may be coupled together by a bus system 522, which may include a power bus, a control signal bus, and a status signal bus in addition to a data bus. The processor 504 may be configured to access instructions stored in the memory 506 to perform beam refinement with aspects of the present disclosure discussed below.

Massive MIMO

Multiple-antenna (multiple-input multiple-output (MIMO)) technology is becoming common for wireless communications and has been incorporated into wireless broadband standards such as long term evolution (LTE) and Wi-Fi, for example. In MIMO, the more antennas the transmitter/receiver is equipped with, the more the possible signal paths (e.g., spatial streams) and the better the performance in terms of data rate and link reliability. Increased number of antennas can also involve increased complexity of the hardware (e.g., number of radio frequency (RF) amplifier frontends) and increased complexity and energy consumption of the signal processing at both ends.

Massive MIMO may involve the use of a very large number of service antennas (e.g., hundreds or thousands) that can be operated coherently and adaptively. The additional antennas may help focus the transmission and reception of signal energy into smaller regions of space. This can lead to huge improvements in throughput and energy efficiency, in particularly when combined with simultaneous scheduling of a large number of user terminals (e.g., tens or hundreds). Massive MIMO can be applied in time division duplex (TDD) operation and also in frequency division duplex (FDD) operation.

Example Beam Selection and Refinement During RACH

A random access channel (RACH) procedure may be performed in certain scenarios, including: during a transition from idle mode to connected mode, intrasystem handovers, Radio Resource Control (RRC) connection re-establishment, and/or when UL/DL data arrives when a UE is in an asynchronous state.

RACH procedures may be contention based or non-contention based. Contention based RACH procedures involve the UE selecting a physical RACH (PRACH) resource. Non-contention based RACH procedures involve an NB allocating resources to a UE.

As described above, mmWave wave communications may bring gigabit speeds to cellular networks due to availability of large amounts of bandwidth. The unique challenges of heavy path-loss faced by millimeter-wave systems necessitate new techniques such as hybrid beamforming (analog and digital), which are not present in legacy 3G and 4G systems. Hybrid beamforming may enhance link budget/SNR that may be exploited during the RACH procedure. Aspects of the present disclosure provide methods and apparatus to utilize hybrid beamforming gains during RACH. Specifically, aspects described herein provide techniques for beam refinement during a RACH procedure.

As described above, certain wireless communication systems may use an antenna array to generate multiple beams. The generated beams may be directional and narrow (e.g., beams may have a narrow angle).

In legacy LTE systems, a UE may perform cell acquisition (including cell detection and cell selection) and access using broadcasted signals such as a primary synchronization signal (PSS)/secondary synchronization signal (SSS)/physical broadcast channel (PBCH)/system information (SI) and common reference signal (CRS). The PSS/SSS/PBCH/SI/CRS signals may be omi-directional (cell/sector wide). A UE measures a received signal strength of any of these signals, selects the strongest cell, and performs contention based RACH on the selected cell.

Figure 6:
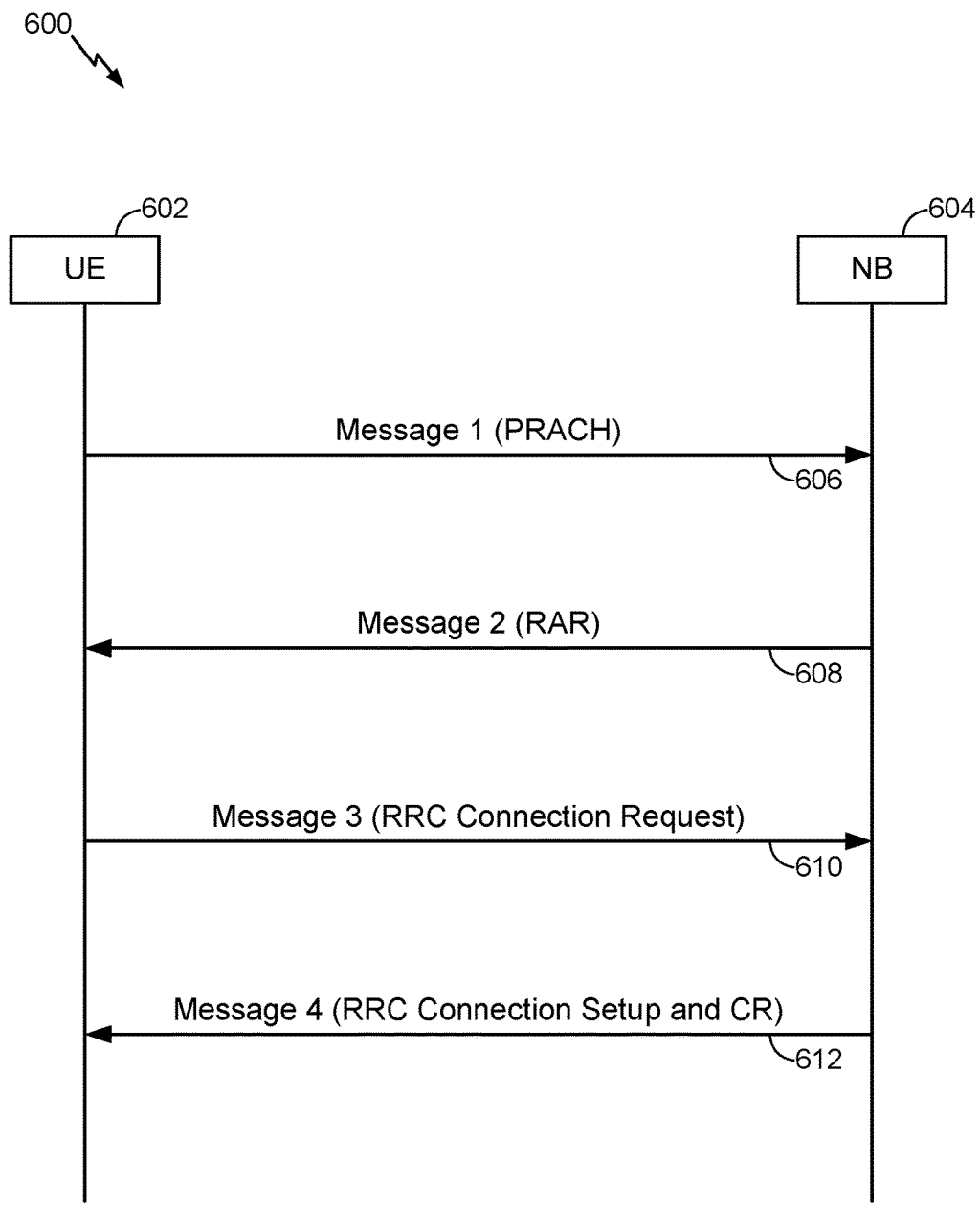
FIG. 6 is a call-flow diagram illustrating exampling signaling between a UE and a NB during a RACH procedure, in accordance with certain aspects of the present disclosure.

FIG. 6 illustrates an example RACH procedure 600 in a legacy system such as a legacy LTE system. For contention-based RACH, a UE 602 and NB 604 may exchange signaling as described herein.

The contention based RACH procedure may begin with the UE selecting a preamble sequence and a time slot number (which determines a random access radio network temporary identity (RARNTI)) to transmit, at 606, the PRACH preamble to the cell (e.g., NB). The PRACH preamble may be referred to as Message 1 of the RACH procedure.

Upon receiving the PRACH preamble, the NB may assign resources, i.e., PDCCH (DCI format 1C) for receiving the random access response (RAR) message using the RARNTI of the UE. At 608, the NB may transmit the RAR on the PDSCH. The RAR may be referred to as Message 2 of the RACH procedure. The RAR may contain timing information, backoff indicator, UL resource grant, and cell radio network temporary identifier (CRNTI). The PDCCH and PDSCH may be received by multiple UEs. For example, the PDCCH and PDSCH may be received by the multiple UEs that attempted RACH during the same time slot.

Upon receiving Message 2 (RAR message), the UE may transmit, at 610, an RRC connection request message to the NB and the UE may begin a contention resolution timer. The RRC connection request message may be referred to as Message 3 of the RACH procedure. The UE may be identified by the temporary CRNTI. The RRC connection request message may be transmitted on the PUSCH. As the PDCCH and PDSCH (at 608) may be received by multiple UEs, multiple UEs may respond with the RRC connection request message at 610.

At 612, the NB may respond to the RRC connection request message with an RRC connection setup and contention resolution (CR) message. The RRC connection setup and CR may be referred to as Message 4 of the RACH procedure. According to aspects, the NB may signal a resource allocation for contention resolution identity (CRI) on the PDCCH. The CRI may be addressed to the temporary mobile subscriber identity (TMSI) or random number from previous steps of the RACH procedure and may contain a new CRNTI, which may be used for further communication. The NB may transmit the CRI on the PDSCH.

While not illustrated, instead of four-step RACH procedure (as illustrated in FIG. 6), a two-step RACH procedure may be performed. In a two-step RACH procedure, Message 1 and Message 3 may be combined and transmitted from the UE to the NB and Message 2 and Message 4 may be combined and transmitted from the NB to the UE. Accordingly, the RACH procedure may have two messages that are transmitted between the UE and NB. The message from the UE to the NB may include the PRACH preamble and the RRC connection request and the message from the NB to the UE may include the RAR and the RRC connection setup and CR.

In an mmWave system, a UE may perform initial beam acquisition (including detection and selection) and access. The UE may listen to broadcasted signals such as PSS/SSS/extended service set (ESS)/beam reference signal (BRS)/and PBCH. The broadcasted signals may be transmitted over directional beams. The UE may measure a signal strength associated with a received BRS and may select the best cell and beam within a cell. The UE may perform contention-based RACH on the selected beam and cell pair.

The BRS signal may be used for initial cell acquisition and handover. BRS may occupy same time as PSS/SSS/ESS but different sets of REs. These broadcasted signals may be transmitted (e.g., carried) over wider beams to allow faster cell/beam detection, selection, and measurement by a UE. Further, the broadcasted signals are semi-static in nature, meaning their beam shapes (beam-widths/gains) and pointing angles may be static or change very slowly over time.

According to an aspect the UE may perform initial beam acquisition based, at least in part on at least one new radio reference signal (NR- synch signal (SS)). NR defines several types of synchronization signals—NR-PSS. NR-SSS and demodulated reference signal (DMRS) associated with PBCH. NR-PSS is defined at least for initial symbol boundary synchronization to the NR cell. NR-SSS is defined for detection of NR cell ID or at least part of NR cell ID. Based, at least in part on one or more NR-SSs, the UE may select a bean for performing a RACH procedure.

The RACH procedure over the selected cell/beam pair may cause RACH failures due to, for example, the selected beams being wider with lower gain and/or the selected cell/beam pair's boresight not pointing towards the UE. In other words, a UE may be located in the intersection of two beams, causing degradation in SNR of received signals.

Accordingly, aspects of the present disclosure provide techniques and apparatus which support the transmission of one or more additional beams by an NB which may be used, by a UE, for beam refinement during a RACH procedure. For example, aspects describe the transmission of one or more additional beams by an NB to refine BRS-based or NR-SS beam selection during a RACH procedure. While examples described herein refer to BRS-based beam selection or NR-SS beam selection, aspects of the present disclosure may support the transmission of one or more additional beams to refine any RS-based beam selection during a RACH procedure. A BRS, or RS transmitted in a synchronization region of a subframe, is only one example of a RS that may be used to select a beam. Using the techniques for beam refinement described herein, a beam selected based on any directional RS beam (not limited to a BRS) may be refined. As an example, directional RSs include BRS, NR-SS, beam formed channel state information signals (CSI-RS), and demodulated reference signal (DMRS).

CSI-RS refers to reference signals with functionalities of CSI acquisition and beam management. DMRS refers to reference signals with functionalities of data and control demodulation and include DMRS with a common search space and DMRS with a user-specific search space.

Beam refinement may refer any alteration of a selected beam, in an effort to facilitate a successful RACH procedure between the UE and NB. Examples of refining a beam may include one or more of selection of another (e.g., close by) beam, selection of another beam within a same wider, directional beam, changing the beamforming characteristics used to generate the beam, changing the weighting used to generate the beam, adjusting the direction of the beam, and/or adjusting the power of the beam.

As described herein, beam refinement during the RACH procedure may address the RACH failure scenarios described above and may, advantageously, facilitate successful RACH procedures for UEs, operating in an mmWave system.

Figure 7:
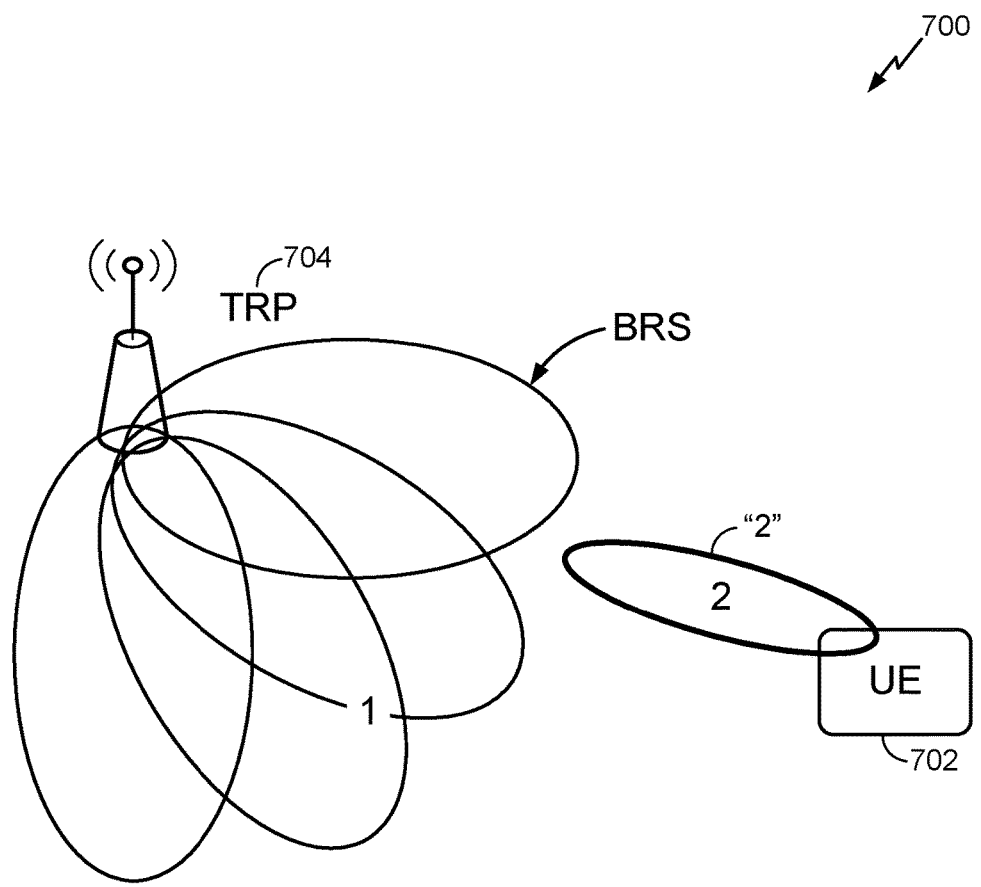
FIG. 7 illustrates an example BRS-based beam selection, in accordance with certain aspects of the present disclosure.

FIG. 7 illustrates an example beam selection 700, based on a BRS, according to aspects of the present disclosure. The transmit/receive point (TRP) may transmit multiple directional RSs (e.g., BRSs). The TRP may be an NB, eNB, gNB, or any DL transmitting device. The UE 702 may be far away from the TRP 704 and/or the UE may detect multiple beams of similar signal strength from the TRP. As shown in FIG. 7, the UE may be located between two beams. The UE may select a beam based on one or more received BRS. The UE may begin a RACH procedure using the selected beam. For example, the UE may transmit a PRACH preamble using beam 2, as illustrated in FIG. 7. According to another example, the UE may select a beam based on one or more received NR-SSs. The UE may begin the RACH procedure using the selected beam.

Figure 8:
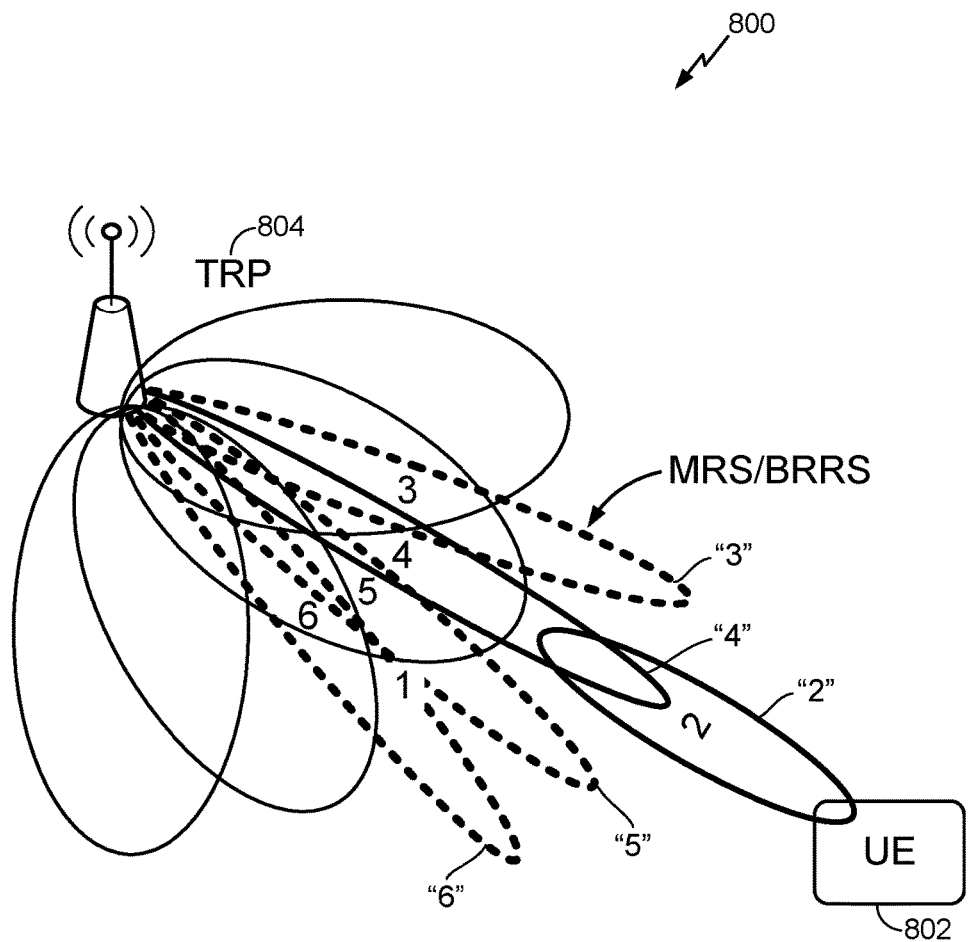
FIG. 8 illustrates an example MRS or BRRS beam refinement during a RACH procedure, in accordance with certain aspects of the present disclosure.

FIG. 8 illustrates an example of beam refinement 800 during the RACH procedure, according to aspects of the present disclosure. As will be described in more detail herein, the TRP 804 (NB, eNB, gNB) may transmit additional signalling to the UE 802. The additional signalling may be used for further refining the beam selected by the UE (e.g., the beam selected by the UE in FIG. 7). The additional signalling transmitted by the TRP may be transmitting via a RACH message and/or via another directional RS, such as, for example, an NR-SS. The UE may refine a beam using the additional signalling.

For example, the TRP may transmit a measurement reference signal (MRS), beam refinement reference signal (BRRS) and/or any directional beam which may be used for further refining the beam selected based on the BRS (e.g., beam 2 from FIG. 7). The additional singling is shown, for example, by beams 3-6 in FIG. 8. The UE may use the one or more transmitted directional beams (e.g., beams 3-6, which may be any directional RS beam such as a MRS or BRRS) to refine its beam selection. For example, UE 802 may switch from beam 2 to beam 4, as a result of the beam refinement process. As illustrated, beam 4 may be a narrower beam within beam 2. Other types of beam refinement may include changing the beamforming characteristics used to generate the beam, changing the weighting used to generate the beam, adjusting the direction of the beam, and/or adjusting the power of the beam. Advantageously, the beam refinement described herein may occur during the RACH procedure.

Aspects described herein refer to BRS, MRS, and BRRS as illustrative examples of directional reference signals; however, the techniques and methods presented herein are not limited to these specific reference signals. The directional reference signals used herein may refer to any type of beam or directional reference signal. Such reference signals may be periodically transmitted in a synchronization region or transmitted on-demand in a non-synchronization region (e.g., data and/or control region). The reference signal may be, for example, beam formed synchronization signals (PSS/SSS), NR-SS, beam formed CSI-RS, BRRS, MRS, or beam formed DMRS.

Trigger for Beam Refinement

A UE may measure a BRS or NR-SS during initial access and may continue to monitor BRSs or NR-SSs during the RACH procedure. According to aspects, after selecting a beam and beginning a RACH procedure using the selected beam, the UE may detect a low signal strength associated with a received BRS or NR-SS. Additionally or alternatively, the UE may detect two or more beams from the same cell (e.g., NB, TRP) with similar signal strength during the RACH procedure. Detecting a low signal strength associated with a received BRS (or NR-SS) and/or detecting two or more beams from the same cell with a similar strength may trigger additional signaling which may be used for beam refinement during the RACH procedure.

According to aspects, a NB may detect low signal strength on the UL. For example, the NB may detect a low signal strength on an UL message transmitted by a UE during the RACH procedure, such as the Message 1 (PRACH preamble) or Message 3 (RRC Connection Request) or combined Message 1 and Message 3 transmission. The low signal strength may trigger additional signaling used for beam refinement by the UE. Additionally or alternatively, the NB may receive a DL BRS report based on the transmitted BRS, which may trigger the additional signaling.

According to aspects, the NB may transmit a reference signal which may be used for beam refinement (e.g., MRS, BRRS, NR-SS) based on the one or more receive beams used by the UE for transmitting Message 1 and/or Message 3 or a combination of Message 1 and Message 3 of the RACH procedure. Accordingly, the NB may determine the signal strength of multiple receive beams. For example, if the NB detects Message 3 from multiple receive beams with similar, low strength, the NB may transmit a MRS and/or BRRS before transmitting Message 4. Similarly, if the NB detected Message 1 from multiple receive beams with similar, low strength, the NB may transmit a MRS/BRRS before transmitting Message 2.

Request, Configuration, and Transmission of Signals Used for Beam Refinement

According to aspects, a UE may request transmissions of additional directional beams such as MRS or BRRS-based beams. For example, the UE may transmit a request for additional beams that may be used for beam refinement in the PRACH during Message 1 (e.g., 606 in FIG. 6). Additionally or alternatively, the UE may request additional beams that may be used for beam refinement over the PUCCH or PUSCH during Message 3 (e.g., 610 in FIG. 6).

According to aspects, the NB may configure a UE to measure multiple directional RS beams such as MRS and/or BRRS. The configuration of the additional beams may be transmitted by a separate message using at least one of a PDCCH or PDSCH. According to aspects, the configuration may be transmitted as part of Message 2 over the PDCCH or PDSCH during the RACH procedure (e.g., 608 in FIG. 6). According to aspects, the UE may use NR-SS transmitting during the RACH procedure for beam refinement.

According to aspects, the UE may be implicitly configured to measure the one or more directional RS beams. For example, at the end of Message 2 (e.g., 608 in FIG. 6), the NB may transmit one or more additional directional RS beams. The UE may receive the additional directional RS beams and may measure and report information associated with the additional directional RS beams as described in more detail below.

Based, at least in part on the configuration for the UE, the NB may transmit one or more directional RS beams (e.g., MRS or BRRS-based beams) tailored to the UE, in an effort to further refine the beam selected based on the BRS.

Measurement and Reporting

The UE may measure the associated signal strength of received directional beams (e.g., MRS or BRRS-based beams or NR-SS) and may transmit a report to the NB via the PUCCH or PUSCH. For each beam configured for the UE, the report may include information indicating the reference signal receive power (RSRP) and the identification of the beam that the UE was configured to measure.

Beam Switch

Based, at least in part on the report transmitted by the UE (directional beam report, MRS, BRRS, and/or NR-SS report), according to aspects, the NB may command the UE to switch to a specific MRS or BRRS ID for the rest of the RACH procedure. The beam switch indication may be signaled by the NB to the UE over the PDCCH or PDSCH.

According to aspects, instead of receiving a command for switching beams, the UE may select a refined beam based on a MRS or BRRS signal strength. The UE may autonomously switch to the selected beam for use during the RACH procedure. For example, the UE may select the best MRS-based beam based on the signal strength, switch to the beam associated with the MRS, and use the newly selected beam for the RACH procedure.

While the example beam refinement procedure described above refers to a single UE refining a beam during a RACH procedure, multiple UEs may simultaneously access the system and perform beam refinement as described herein.

A UE may initiate a T300 timer when it transmits an RRC Connection Request message (e.g., Message 3, 610 in FIG. 6). If the timer expires before the UE has received a response, for example, in the form of an RRC Connection Setup or Reject, the UE may inform the higher layers and end the connection procedure. In an effort to account for extra time associated with beam refinement during the RACH procedure, the UE may freeze or adjust the T300 timer.

The messages described above and including L1 control, MAC-CE, and RRC may occur over the mmWave standalone link or over LTE/New Radio (NR)-sub 6 GHz spectrum bands.

Figure 9:
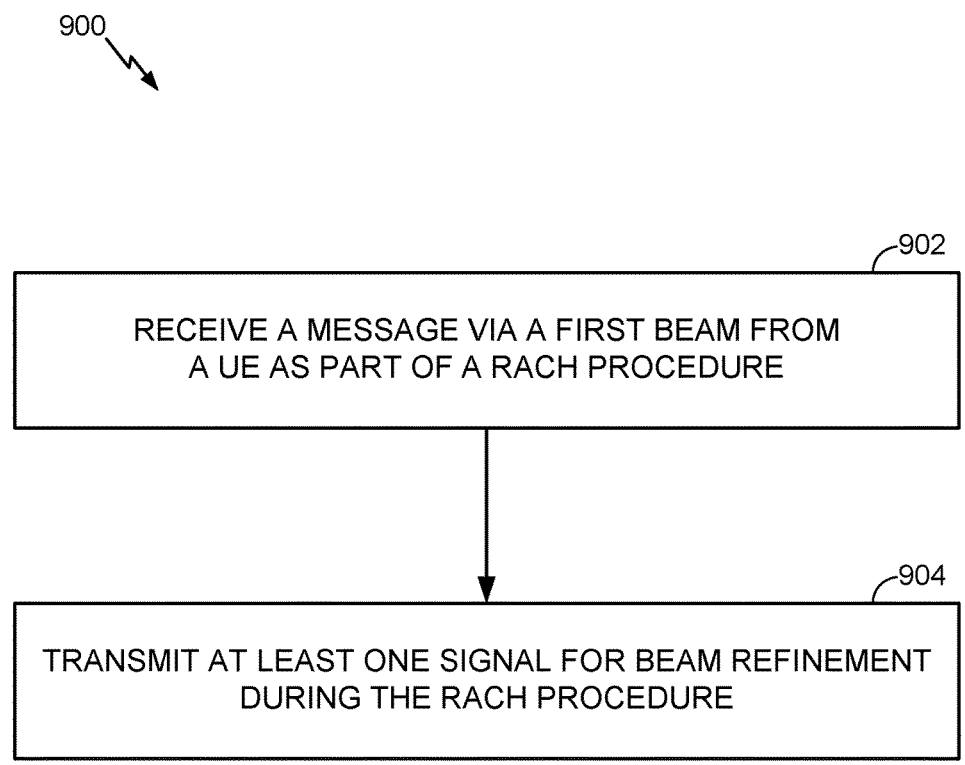
FIG. 9 illustrates example operations performed, by a NB, in accordance with certain aspects of the present disclosure.

FIG. 9 illustrates example operations 900 which may be performed for beam refinement during a RACH procedure according to aspects of the present disclosure. The operations may be performed by a wireless communication device such as a NB 110 which may include one or more components illustrated in FIG. 2 and FIG. 5.

At 902, the NB may receive a message via a first beam from a UE as part of a RACH procedure. For example, the NB may receive a Message 1 (PRACH preamble) from the UE or may receive a Message 3 (RRC Connection Request) on a PUSCH from the UE using the first beam. As another example, the NB may receive a combined message including a PRACH preamble and RRC connection request.

At 904, the NB may transmit at least one signal for beam refinement during the RACH procedure. For example, the signal may be an NR-SS. The NB may transmit the signal for beam refinement after receiving the Message 1 (PRACH preamble), Message 3 (RRC Connection Request), or combined PRACH preamble and RRC Connection Request (e.g., combined message including Message 1 and Message 3).

For illustrative purposes, and as described above, the NB may transmit a BRS. The BRS may be transmitted during the RACH procedure and may be used for selection of the first beam. The NB may receive an indication, from the UE that a signal strength associated with the BRS is below a threshold value. In response, the NB may transmit a signal for further refining the first beam.

According to aspects, the NB may receive an indication from the UE of more than one beam of similar strength from a cell associated with the NB during the RACH procedure. In response to the indication, the NB may transmit a signal for further refining the first beam.

According to aspects, the NB may determine an uplink signal strength associated with the received message of the RACH procedure is below a threshold value. In response, the NB may transmit a signal for further refining the first beam.

The NB may receive the message from the UE as part of the RACH procedure using the first beam and one or more other beams. The multiple receive beams may be associated with a similar signal strength. In response to receiving the message from multiple beams of similar signal strength, the NB may transmit the signal for further refining the first beam.

According to aspects, the message received via the first beam as part of the RACH procedure may include a request for a signal for further refining the first beam.

According to aspects, the NB may transmit multiple directional RS (e.g., measurement reference signal (MRS)-based beams). Additionally, the NB may configure the UE to measure the multiple directional RS (e.g., MRS-based beams) and may receive a report from the UE including reference signal receive power (RSRP) and directional RS ID (e.g., MRS ID) associated with each of the directional RS (e.g., MRS-based beams). The NB may instruct the UE to switch to one of the directional RS beams (e.g., MRS-based beams) for the RACH procedure based, at least in part, on the received report. According to aspects, the UE may select a second, refined beam based on the one or more directional RS.

After transmitting the signal for beam refinement, the NB may receive a message as part of the RACH procedure via a second, refined beam. The at least one signal for beam refinement may include at least one of a MRS, BRRS, NR-SS, or any other directional RS beam.

Figure 10:
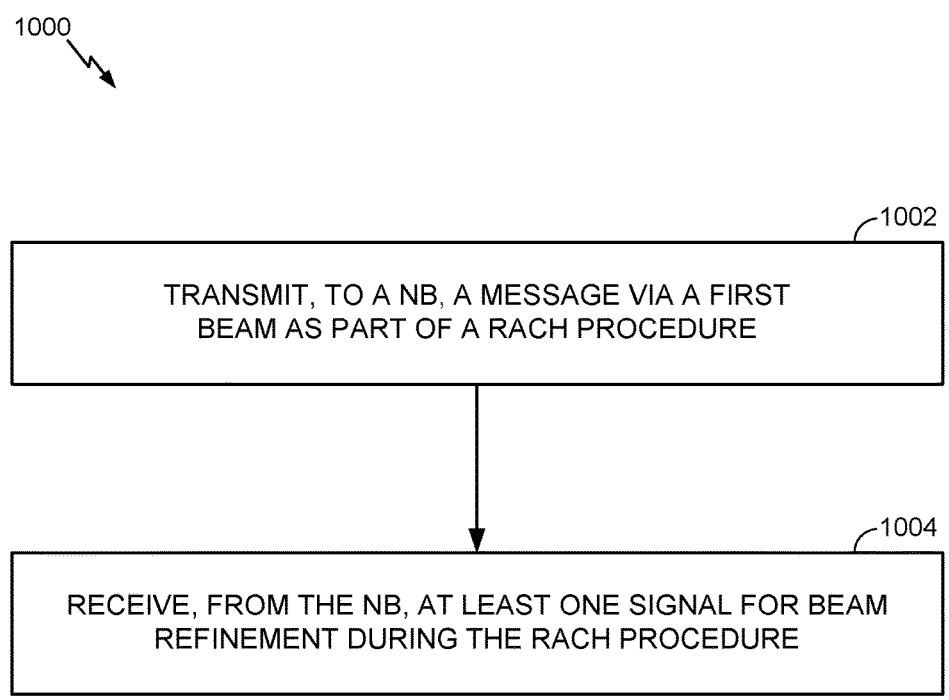
FIG. 10 illustrates example operations performed by a UE, in accordance with certain aspects of the present disclosure.

FIG. 10 illustrates example operations 1000 performed by a UE for beam refinement according to aspects of the present disclosure. The operations may be performed by a wireless communication device such as a UE 120 which may include one or more components illustrated in FIG. 2 and FIG. 5.

At 1002, the UE may transmit to a NB, a message via a first beam as part of a RACH procedure. For example, the UE may transmit a Message 1 (PRACH preamble), a Message 3 (RRC Connection Request) on a PUSCH as part of the RACH procedure, or combined message transmitting the PRACH preamble and RRC Connection Request (e.g., combined Message 1 and Message 3).

At 1004, the UE may receive, from the NB, at least one signal for beam refinement during the RACH procedure.

According to an example, the signal for beam refinement may be an NR-SS. According to aspects, the UE may receive a directional RS (e.g., BRS) during the RACH procedure. The UE may transmit an indication that a signal strength associated with the directional RS (e.g., BRS) is below a threshold value. In response, the UE may receive a signal for beam refinement.

According to aspects, the UE may transmit an indication of more than one beam of similar strength received from a cell associated with the NB during the RACH procedure. In response to the indication, the UE may receive the signal for beam refinement.

According to aspects, the NB may determine that the signal strength of the transmitted message via the first beam may be below a threshold value. In response, the UE may receive the at least one signal for beam refinement.

According to aspects, the UE may transmit the message as part of the RACH procedure using the first beam and at least another beam. The multiple transmit beams may have a similar signal strength. In response to the message transmitted using the multiple transmit beams, the UE may receive the signal for beam refinement.

The message transmitted via the first beam as part of RACH procedure may include a request for the signal for beam refinement.

As described above, the UE may receive multiple directional RS (e.g., measurement reference signal (MRS)-based beams) for beam refinement. The UE may measure the multiple directional RS (e.g., MRS-based beams) and may transmit a report to the NB including at least one of a directional RS reference signal receive power (RSRP) or directional RS ID (e.g., MRS RSRP or MRS ID) associated with each of the directional RS beams (e.g., MRS-based beams).

The UE may receive an instruction to switch to one of the directional RS-based beams (MRS-based beams) for the RACH procedure based, at least in part, on the transmitted report. Alternatively, after receiving the signal for further refining the first beam, the UE may select a refined beam and may transmit message as part of the RACH procedure the refined beam.

As described herein, beam selection and refinement may occur during a RACH procedure. By refining beam selection during the RACH procedure, a UE may avoid RACH failures due to, for example, poor initial beam selection.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "identifying" encompasses a wide variety of actions. For example, "identifying" may include calculating, computing, processing, deriving, investigating, looking up (e.g., looking up in a table, a database or another data structure), ascertaining and the like. Also, "identifying" may include receiving (e.g., receiving information), accessing (e.g., accessing data in a memory) and the like. Also, "identifying" may include resolving, selecting, choosing, establishing and the like.

In some cases, rather than actually communicating a frame, a device may have an interface to communicate a frame for transmission or reception. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in figures, those operations may have corresponding counterpart means-plus-function components.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in Figures, those operations may be performed by any suitable corresponding counterpart means-plus-function components.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication by a node B (NB), comprising:
   transmitting, by the NB, a first one or more directional beams to enable a user equipment (UE) to select a first beam;
   receiving, by the NB, a message via the first beam from the UE as part of a random access channel (RACH) procedure; and
   transmitting, by the NB, a second one or more directional beams for beam refinement during the RACH procedure, wherein the second one or more directional beams enable the UE to switch to a second beam, wherein the second beam is a narrower beam within the first beam.

2. The method of claim 1, wherein the second one or more directional beams for beam refinement comprises a new radio reference signal (NR-SS).

3. The method of claim 1, wherein the second one or more directional beams for beam refinement are transmitted after receiving at least one of a Physical Random Access Channel (PRACH) preamble or Radio Resource Connection (RRC) request associated with the RACH procedure from the UE.

4. The method of claim 1, wherein:
   transmitting the first one or more directional beams comprises transmitting a beam reference signal (BRS) during the RACH procedure; and further comprising:
   receiving an indication that a signal strength associated with the BRS is below a threshold value, wherein
   in response to the indication, transmitting the second one or more beams for beam refinement.

5. The method of claim 1, further comprising:
   receiving an indication from the UE of more than one beam of similar strength from a cell associated with the NB during the RACH procedure; and in response to the indication, transmitting the second one or more beams for beam refinement.

6. The method of claim 1, further comprising:
determining an uplink signal strength associated with the received message of the RACH procedure is below a threshold value; and
in response to the determination, transmitting the second one or more beams for beam refinement.

7. The method of claim 1, further comprising:
receiving the message as part of the RACH procedure from multiple receive beams associated with a similar signal strength; and
in response to receiving the message, transmitting the second one or more beams for beam refinement.

8. The method of claim 1, wherein the message received via the first beam from the UE as part of the RACH procedure comprises a request for the second one or more directional beams for beam refinement.

9. The method of claim 1,
wherein transmitting the second one or more directional beams signal for beam refinement comprises transmitting multiple measurement reference signal (MRS)-based beams; and further comprising:
receiving a report, from the UE, comprising at least one of a MRS reference signal receive power (RSRP) or MRS ID associated with each of the MRS-based beams.

10. The method of claim 9, further comprising:
instructing the UE to switch to one of the MRS-based beams for the RACH procedure based, at least in part, on the received report.

11. The method of claim 1, further comprising:
after transmitting the second one or more directional beams for beam refinement, receiving a message as part of the RACH procedure via the second beam.

12. The method of claim 1, wherein the second one or more directional beams for beam refinement comprises a directional reference signal beam.

13. A method for wireless communication by a user equipment (UE), comprising:
receiving, by the UE, a first one or more directional beams to enable the UE to select a first beam;
transmitting, by the UE to a node B (NB), a message via the first beam as part of a random access channel (RACH) procedure; and
receiving, by the UE from the NB, a second one or more directional beams for beam refinement during the RACH procedure, wherein the second one or more directional beams enable the UE to switch to a second beam, wherein the second beam is a narrower beam within the first beam.

14. The method of claim 13, wherein the second one or more directional beams for beam refinement comprises a new radio reference signal (NR-SS).

15. The method of claim 13, wherein the second one or more directional beams for beam refinement are received after one of:
transmitting at least one of a Physical Random Access Channel (PRACH) preamble or Radio Resource Connection (RRC) request to the NB as part of the RACH procedure.

16. The method of claim 13, wherein:
receiving the first one or more directional beams comprises receiving a beam reference signal (BRS) during the RACH procedure; and further comprising:
transmitting an indication that a signal strength associated with the BRS is below a threshold value, wherein in response to the indication, receiving the second one or more directional beams for beam refinement.

17. The method of claim 13, further comprising:
transmitting an indication of more than one beam of similar strength from a cell associated with the NB during the RACH procedure; and
in response to the indication, receiving the second one or more directional beams for beam refinement.

18. The method of claim 13, wherein a signal strength of the transmitted message via the first beam is below a threshold value.

19. The method of claim 13, further comprising:
transmitting the message as part of the RACH procedure from multiple transmit beams associated with a similar signal strength; and
in response to the transmitted message, receiving the second one or more directional beams for beam refinement.

20. The method of claim 13, wherein the message transmitted via the first beam as part of the RACH procedure comprises a request for the second one or more directional beams for beam refinement.

21. The method of claim 13,
wherein receiving the second one or more directional beams for beam refinement comprises receiving multiple measurement reference signal (MRS)-based beams; and further comprising:
measuring the multiple MRS-based beams; and
transmitting a report, to the NB, comprising at least one of a MRS reference signal receive power (RSRP) or MRS ID associated with each of the MRS-based beams.

22. The method of claim 21, further comprising:
receiving, from the NB, an instruction to switch to one of the MRS-based beams for the RACH procedure based, at least in part, on the transmitted report.

23. The method of claim 13, further comprising:
after receiving the least second one or more directional beams for beam refinement, transmitting a message as part of the RACH procedure via second beam.

24. The method of claim 13, wherein the second one or more directional beams for beam refinement comprises a directional reference signal beam.

25. An apparatus for wireless communication by a node B (NB), comprising:
means for transmitting, by the NB, a first one or more directional beams to enable a user equipment (UE) to select a first beam;
means for receiving, by the NB, a message via the first beam from the UE as part of a random access channel (RACH) procedure; and
means for transmitting, by the NB, a second or one more directional beams for beam refinement during the RACH procedure, wherein the second one or more directional beams enable the UE to switch to a second beam, wherein the second beam is a narrower beam within the first beam.

26. The apparatus of claim 25, wherein the second one or more directional beams for beam refinement comprises a new radio reference signal (NR-SS).

27. The apparatus of claim 25, wherein the second one or more directional beams for beam refinement are transmitted after receiving at least one of a Physical Random Access Channel (PRACH) preamble or Radio Resource Connection (RRC) request associated with the RACH procedure from the UE.

28. An apparatus for wireless communication by a user equipment (UE), comprising:
- means for receiving, by the UE, a first one or more directional beams to enable the UE to select a first beam;
- means for transmitting, by the UE to a node B (NB), a message via the first beam as part of a random access channel (RACH) procedure; and
- means for receiving, by the UE from the NB, s second one or more directional beams for beam refinement during the RACH procedure, wherein the second one or more directional beams enable the UE to switch to a second beam, wherein the second beam is a narrower beam within the first beam.

29. The apparatus of claim 28, wherein the second one or more directional beams comprises a new radio reference signal (NR-SS).

30. The apparatus of claim 28, further comprising:
- means for transmitting an indication of more than one beam of similar strength from a cell associated with the NB during the RACH procedure; and
- in response to the indication, means for receiving the second one or more directional beams for beam refinement.

* * * * *